United States Patent
Ozaki et al.

(10) Patent No.: US 12,513,730 B2
(45) Date of Patent: Dec. 30, 2025

(54) REMOTE WIRELESS DEVICE AND COMMUNICATION METHOD OF REMOTE WIRELESS DEVICE

(71) Applicant: SMC CORPORATION, Tokyo (JP)

(72) Inventors: Norimasa Ozaki, Moriya (JP); Toshiaki Kuwahara, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 672 days.

(21) Appl. No.: 17/663,735

(22) Filed: May 17, 2022

(65) Prior Publication Data

US 2022/0377757 A1 Nov. 24, 2022

(30) Foreign Application Priority Data

May 21, 2021 (JP) .................................. 2021-085808

(51) Int. Cl.
*H04W 72/542* (2023.01)
*H04W 72/02* (2009.01)

(52) U.S. Cl.
CPC ......... *H04W 72/542* (2023.01); *H04W 72/02* (2013.01)

(58) Field of Classification Search
CPC .............................. H04W 72/542; H04W 72/02
See application file for complete search history.

(56) References Cited

U.S. PATENT DOCUMENTS

| | | | |
|---|---|---|---|
| 2016/0165624 A1 | 6/2016 | Benveniste | |
| 2017/0289959 A1 | 10/2017 | Aki et al. | |
| 2018/0167976 A1 | 6/2018 | Wentink | |

(Continued)

FOREIGN PATENT DOCUMENTS

| | | | |
|---|---|---|---|
| EP | 1 374 496 B1 | 9/2009 | |
| EP | 3 297 359 A1 | 3/2018 | |
| JP | 10-117213 A | 5/1998 | |

(Continued)

OTHER PUBLICATIONS

Extended European Search Report issued Sep. 26, 2022 in European Patent Application No. 22174122.6, 9 pages.

(Continued)

*Primary Examiner* — Rhonda L Murphy
(74) *Attorney, Agent, or Firm* — Oblon, McClelland, Maier & Neustadt, L.L.P.

(57) ABSTRACT

A remote wireless device transmits and receives signals to and from a base wireless device in a transmission/reception period, and includes a transmission/reception processing unit that performs a transmission process of a signal in each of a plurality of continuous transmission/reception periods until transmission to the base wireless device is made successfully. A counting unit counts a number of times the transmission processes is performed. A transmission selection unit selects whether to perform the transmission process or stand by in a next transmission/reception period in accordance with a predetermined rule in a case that a count value by the counting unit is equal to or greater than a predetermined number. A transmission prohibition unit prohibits the transmission process by the transmission/reception processing unit in a case that standby is selected by the transmission selection unit.

8 Claims, 9 Drawing Sheets

(56) References Cited

U.S. PATENT DOCUMENTS

2021/0235478 A1* 7/2021 Karaki ................ H04W 72/23
2023/0328775 A1* 10/2023 Do .................... H04W 74/0808
370/328

FOREIGN PATENT DOCUMENTS

| JP | 2016-32143 A | 3/2016 |
| JP | 2017-188868 A | 10/2017 |

OTHER PUBLICATIONS

Japanese Office Action issued Jan. 14. 2025 in Japanese Patent Application No. 2021-085806 with English translation, 10 pgs.

* cited by examiner

REMOTE WIRELESS DEVICE AND COMMUNICATION METHOD OF REMOTE WIRELESS DEVICE

CROSS-REFERENCE TO RELATED APPLICATIONS

This application is based upon and claims the benefit of priority from Japanese Patent Application No. 2021-085808 filed on May 21, 2021, the contents of which are incorporated herein by reference.

BACKGROUND OF THE INVENTION

Field of the Invention

The present invention relates to a remote wireless device that transmits and receives signals to and from a base wireless device in a transmission/reception period, and a communication method of the remote wireless device.

Description of the Related Art

JP 2017-188868 A discloses an industrial wireless communication system including a computer and a plurality of communication networks. The computer manages and controls a plurality of robots and the like. Each communication network includes a single base wireless device and a plurality of remote wireless devices. The base wireless device is connected to the computer. Meanwhile, each remote wireless device is connected to a sensor and an actuator. The sensor and the actuator are provided for a robot or the like. For example, the base wireless device transmits a signal for instructing the operation of the actuator to each remote wireless device. In contrast, each remote wireless device transmits a signal indicating a detection result of the sensor or the like to the base wireless device. In the wireless communication system disclosed in JP 2017-188868 A, the base wireless device and the plurality of remote wireless devices carry out frequency hopping at predetermined periods. This prevents radio wave interference between the base wireless device and the surrounding wireless devices. Similarly, by hopping the frequency, radio wave interference between each remote wireless device and the surrounding wireless devices is prevented. The period for frequency hopping is referred to as a transmission/reception period.

SUMMARY OF THE INVENTION

In the communication network disclosed in JP 2017-188868 A, a plurality of remote wireless devices perform frequency hopping in the same hopping pattern and the same transmission/reception period. For this reason, collision of signals transmitted by each remote wireless device is likely to occur. If the signals collide, each remote wireless device retransmits the signal. In such a case, if each remote wireless device continuously retransmits a signal at the same frequency at the same period, signal collision occurs repeatedly. Then, it takes a long time to complete the transmission of each remote wireless device. As a result, the communication speed of the wireless communication system decreases, and the processing capacity of each of the robots or the like decreases.

An object of the present invention is to solve the aforementioned problem.

According to one aspect of the present invention, there is provided a remote wireless device that transmits and receives signals to and from a base wireless device in a transmission/reception period, including a transmission/reception processing unit configured to perform a transmission process of a signal in each of a plurality of continuous transmission/reception periods until transmission to the base wireless device is made successfully, a counting unit configured to count number of times of performed transmission processes, a transmission selection unit configured to select whether to perform the transmission process or stand by in a next transmission/reception period in accordance with a predetermined rule in a case that a count value by the counting unit is equal to or greater than a predetermined number, and a transmission prohibition unit configured to prohibit the transmission process by the transmission/reception processing unit in a case that standby is selected by the transmission selection unit.

According to another aspect of the present invention, there is provided a communication method of a remote wireless device that transmits and receives a signal to and from a base wireless device in a transmission/reception period, the method including a transmission/reception processing step of performing a transmission process of a signal in each of a plurality of continuous transmission/reception periods until transmission to the base wireless device is made successfully, a counting step of counting number of times of performed transmission processes, a transmission selection step of selecting whether to perform the transmission process or stand by in a next transmission/reception period in accordance with a predetermined rule in a case that a count value by the counting step is equal to or greater than a predetermined number, and a transmission prohibition step of prohibiting the transmission process in a case that standby is selected in the transmission selection step.

According to the present invention, it is possible to reduce the number of collisions of signals transmitted to a base wireless device.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

1 First Embodiment

[1-1 Wireless Communication System 10]

Figure 1:
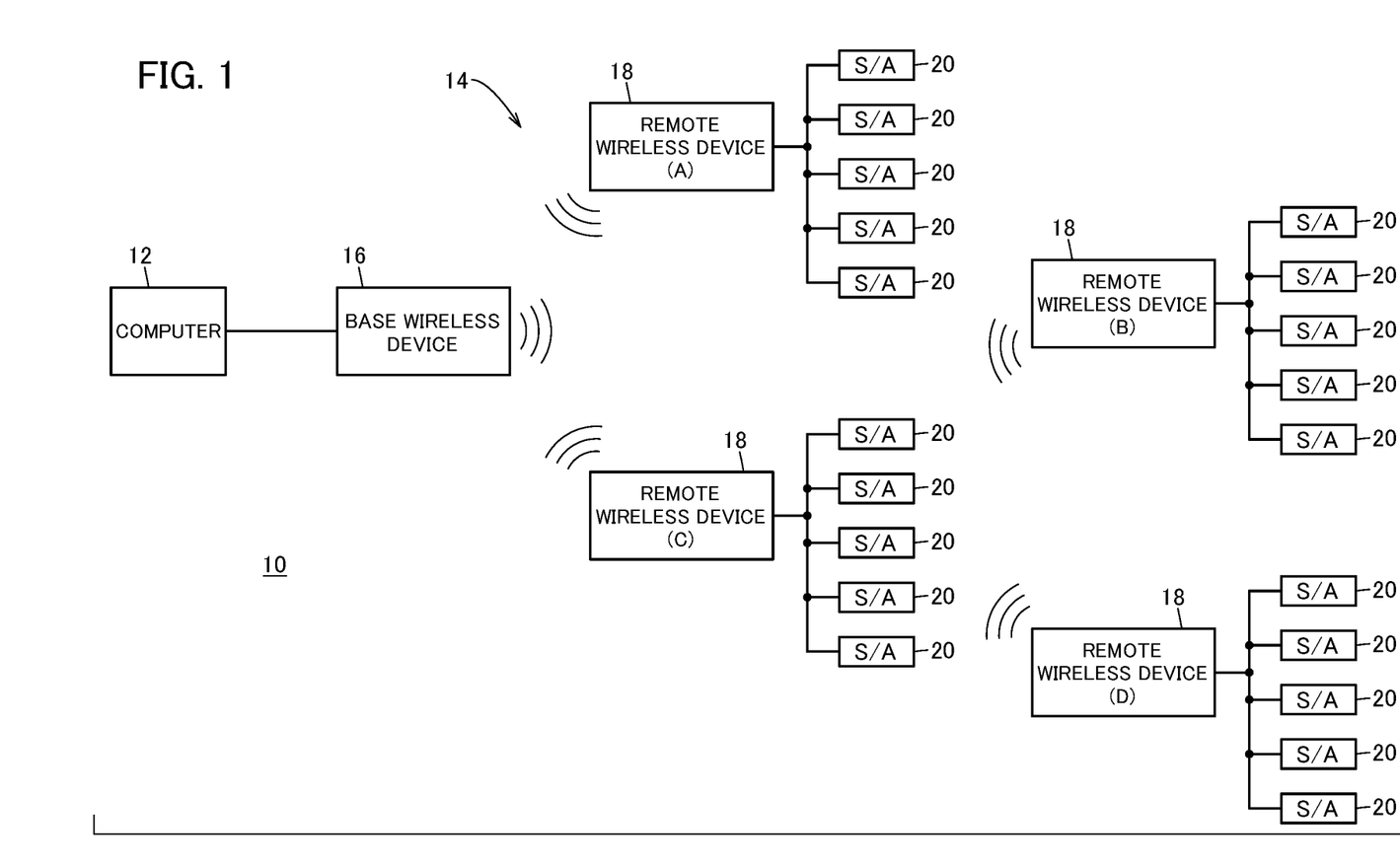
FIG. 1 is a diagram illustrating a configuration of a wireless communication system.
Figure 2:
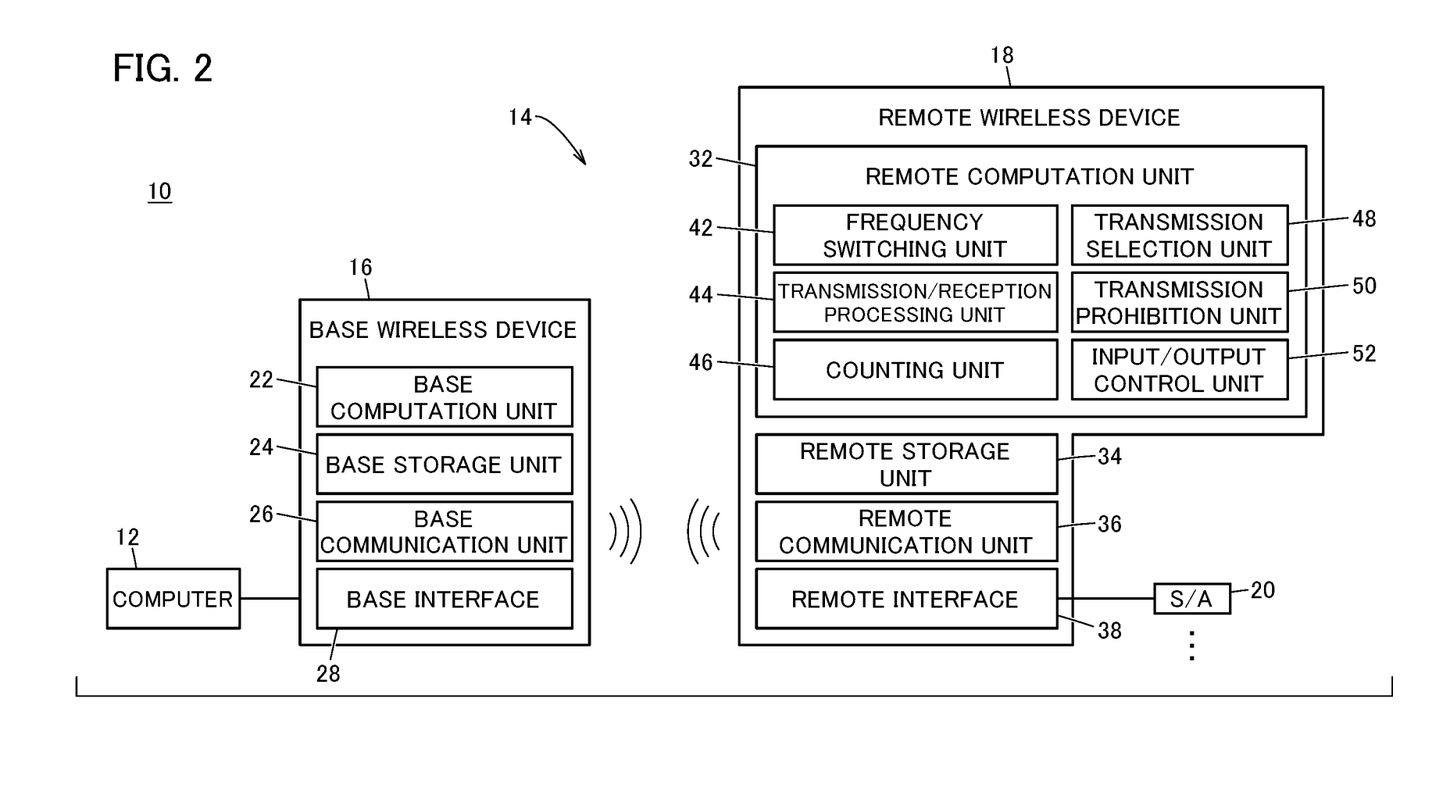
FIG. 2 is a functional block diagram of the wireless communication system according to a first embodiment.

FIG. 1 is a diagram illustrating a configuration of a wireless communication system 10. FIG. 2 is a functional block diagram of the wireless communication system 10 according to the first embodiment. The industrial wireless communication system 10 includes a single computer 12 and at least one communication network 14. The one communication network 14 includes a single base wireless device 16 and a plurality of remote wireless devices 18. The industrial facility is provided with one or more robots (not shown) and the like.

The computer 12 monitors and controls the one or more robots and the like. The computer 12 may include, for example, a programmable logic controller (PLC). The computer 12 includes an interface (not illustrated) for performing wired or wireless transmission and reception. The computer 12 transmits signals to the base wireless device 16 via an interface. The computer 12 also receives signals transmitted from the base wireless device 16 via the interface.

The one or more robots or the like include one or more actuators and one or more sensors. The actuator operates in accordance with instructions from the computer 12. The sensor detects an operation of the robot. The sensor and actuator are also collectively referred to herein as S/A 20. The actuator receives a control signal transmitted from the computer 12 via the base wireless device 16 and the remote wireless device 18. The sensor transmits a sensor signal indicative of the detection result to the computer 12 via the base wireless device 16 and the remote wireless device 18.

[1-2 Base Wireless Device 16]

As illustrated in FIG. 2, the base wireless device 16 includes a base computation unit 22, a base storage unit 24, a base communication unit 26, and a base interface 28.

The base computation unit 22 includes processing circuitry. The processing circuitry may be a processor such as a CPU. The processing circuitry may be an integrated circuit such as an ASIC, an FPGA, or the like. A processor has various functions by executing programs stored in the base storage unit 24. For example, the base computation unit 22 uses the base interface 28 to perform a process of receiving a signal from the computer 12. Further, the base computation unit 22 uses the base interface 28 to perform a process of transmitting a signal to the computer 12. Further, the base computation unit 22 uses the base communication unit 26 to perform a process of receiving signals from the plurality of remote wireless devices 18. Further, the base computation unit 22 uses the base communication unit 26 to perform a process of transmitting signals to the plurality of remote wireless devices 18. Further, the base computation unit 22 switches the frequency of a channel used for communication with each of the remote wireless devices 18 based on the hopping information.

The base storage unit 24 includes a volatile memory and a nonvolatile memory. Examples of the volatile memory include a RAM. Examples of the nonvolatile memory include a ROM, a flash memory, and the like. The volatile memory stores, for example, data acquired externally and data calculated by the base computation unit 22. The nonvolatile memory stores, for example, a predetermined program and a predetermined numerical value. The base storage unit 24 stores hopping information that is common to the remote wireless devices 18. The hopping information includes information of a hopping pattern and information of a transmission/reception period. At least a part of the base storage unit 24 may be included in a processor, an integrated circuit, or the like as described above.

The base communication unit 26 includes a communication circuit. The communication circuit includes a transmission circuit and a reception circuit. The base communication unit 26 transmits signals to the remote wireless devices 18. The base communication unit 26 receives signals transmitted by the remote wireless devices 18.

The base interface 28 includes an input/output interface for carrying out wired communication with the computer 12.

[1-3 Remote Wireless Device 18]

As shown in FIG. 2, the remote wireless device 18 includes a remote computation unit 32, a remote storage unit 34, a remote communication unit 36, and a remote interface 38.

The remote computation unit 32 includes processing circuitry. The processing circuitry may be a processor such as a CPU. The processing circuitry may be an integrated circuit such as an ASIC, an FPGA, or the like. The remote computation unit 32 has various functions by executing programs stored in the base storage unit 24. For example, the remote computation unit 32 functions as a frequency switching unit 42, a transmission/reception processing unit 44, a counting unit 46, a transmission selection unit 48, a transmission prohibition unit 50, and an input/output control unit 52.

The frequency switching unit 42 switches the frequency of the channel used by the remote communication unit 36 based on the hopping information. The hopping information is stored in advance in the remote storage unit 34.

The transmission/reception processing unit 44 uses the transmission circuit of the remote communication unit 36 to perform a process of transmitting a signal to the base wireless device 16. In addition, the transmission/reception processing unit 44 uses the reception circuit of the remote communication unit 36 to perform a process of receiving a signal transmitted by the base wireless device 16. The transmission/reception processing unit 44 transmits a signal of one packet in one transmission/reception period. The transmission/reception processing unit 44 performs a series of transmission process (FIG. 4) when transmitting a signal of one packet. The transmission process includes a clear channel assessment (CCA), a process of transmitting a signal, and a process of receiving an acknowledgement (ACK) transmitted from the base wireless device 16.

The counting unit 46 counts the number of times of transmission processes performed during a certain time period from when a transmission of a signal for one packet is started to when the transmission has been made successfully.

When a count value N of the counting unit 46 is equal to or greater than a predetermined number, the transmission selection unit 48 selects whether to perform the transmission process or stand by in the next transmission/reception period. The transmission selection unit 48 makes a selection in accordance with a predetermined rule. The predetermined rule is stored in the remote storage unit 34. The predetermined rule may be information that determines a selection order of transmission and standby. Further, the predetermined rule may be an algorithm etc. for making a selection at random, for example, an algorithm for generating a pseudo random number sequence.

When standby is selected by the transmission selection unit 48, the transmission prohibition unit 50 prohibits a transmission process by the transmission/reception processing unit 44.

The input/output control unit 52 uses the remote interface 38 to perform a process of transmitting a control signal to each S/A 20. In addition, the input/output control unit 52 uses the remote interface 38 to perform a process of receiving a sensor signal transmitted by each S/A 20.

The remote storage unit 34 includes a volatile memory and a nonvolatile memory. Examples of the volatile memory include a RAM. Examples of the nonvolatile memory include a ROM and a flash memory. The volatile memory stores, for example, data acquired externally and data calculated by the remote computation unit 32. The nonvolatile memory stores, for example, a predetermined program and a predetermined numerical value. The remote storage unit 34 stores hopping information that is common to the base wireless device 16. The hopping information includes information of a hopping pattern and information of a transmission/reception period. At least a part of the remote storage unit 34 may be included in a processor, an integrated circuit, or the like as described above.

The remote communication unit 36 includes a communication circuit. The communication circuit includes a transmission circuit and a reception circuit. The remote communication unit 36 transmits a signal to the base wireless device 16. The remote communication unit 36 receives a signal transmitted by the base wireless device 16.

The remote interface 38 includes an input/output interface for carrying out wired communication with each S/A 20. The remote interface 38 may include a wireless interface for carrying out short-range wireless communication with each S/A 20.

[1-4 Process Performed by Remote Wireless Device 18]

[A Main Process]

Figure 3:
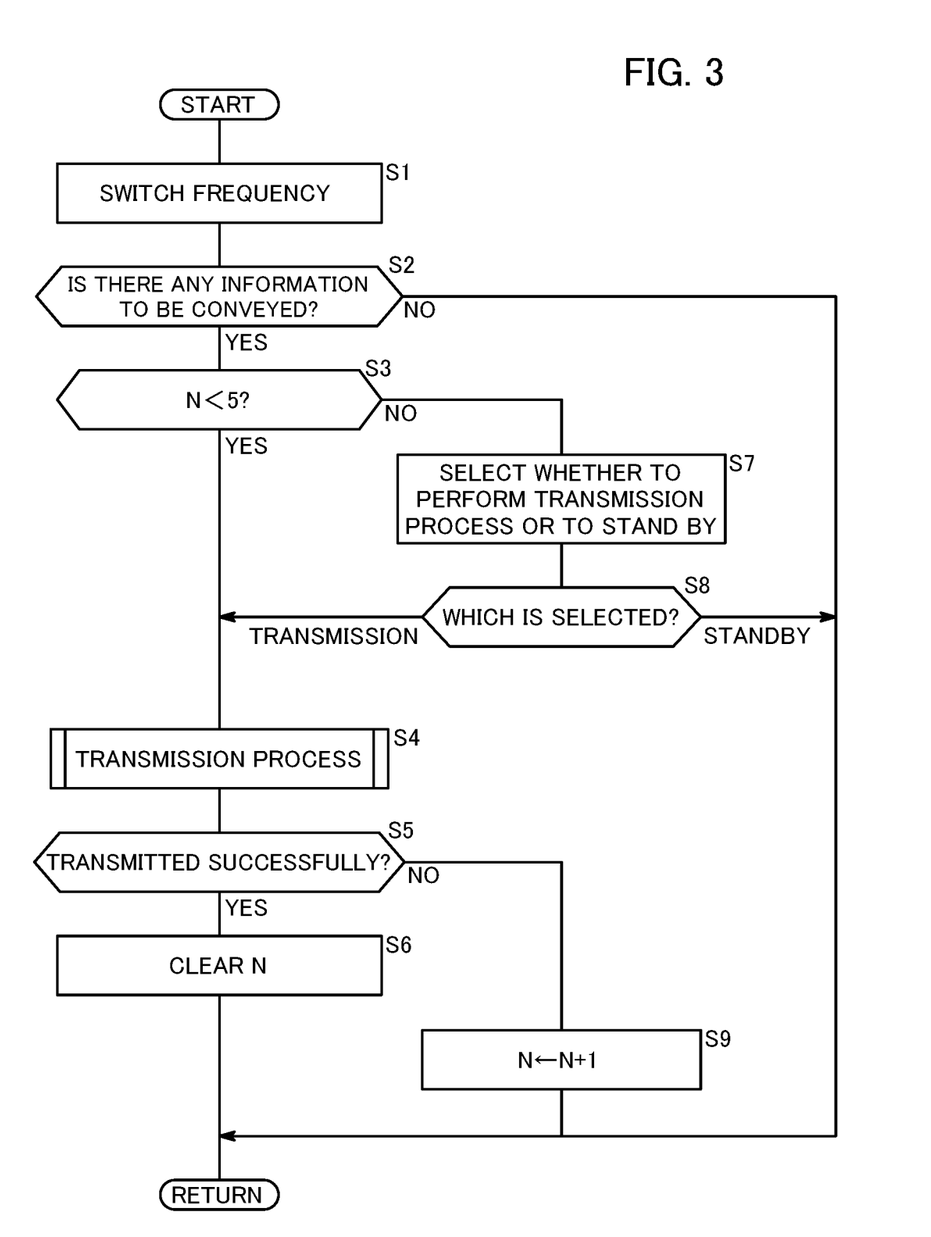
FIG. 3 is a flowchart illustrating a main process according to the first embodiment.

A main process executed by the remote wireless device 18 will be described. The main process is performed when the remote wireless device 18 transmits a signal. FIG. 3 is a flowchart showing the main process according to the first embodiment. The remote computation unit 32 performs the main process shown in FIG. 3 for each transmission/reception period. Before the first main process is performed, the counting unit 46 sets the count value N to 0. The count value N indicates the number of transmission processes performed from the start of transmission of a signal corresponding to one packet to the success of the transmission.

In step S1, the frequency switching unit 42 switches the channel frequency in accordance with the hopping pattern stored in the remote storage unit 34. Upon completion of step S1, the process proceeds to step S2.

In step S2, the transmission/reception processing unit 44 determines whether there is any information to be conveyed to the computer 12. The information to be conveyed is, for example, a sensor signal acquired from the S/A 20. If there is such information to be conveyed (step S2: YES), control proceeds to step S3. On the other hand, if there is not any information to be conveyed (step S2: NO), the process in the current transmission/reception period ends.

In step S3, the counting unit 46 compares the count value N with a predetermined number (in this instance, five). The predetermined number is an upper limit value of the number of times of transmission process that is consecutively performed. The predetermined number is stored in advance in the remote storage unit 34. When the count value N is less than the predetermined number (step S3: YES), the process proceeds to step S4. On the other hand, when the count value N is equal to or greater than the predetermined number (step S3: NO), the process proceeds to step S7.

When the process proceeds from step S3 or step S8 described later to step S4, the transmission/reception processing unit 44 performs the transmission process illustrated in FIG. 4. In the transmission process, the transmission/reception processing unit 44 performs a series of process for transmitting a signal indicating the information to be conveyed to the base wireless device 16. Upon completion of step S4, the process proceeds to step S5.

In step S5, the transmission/reception processing unit 44 determines whether or not signal transmission has been made successfully in the transmission process performed in step S4. When the signal transmission has been made successfully (step S5: YES), the process proceeds to step S6. Otherwise, if the signal transmission has failed (step S5: NO), the proceeds to step S9.

In step S6, the counting unit 46 clears the count value N. When the step S6 is completed, the process in which the remote wireless device 18 transmits a signal of one packet is completed.

When the process proceeds from step S3 to step S7, the transmission selection unit 48 selects whether to perform the transmission process or to stand by without performing the transmission process. The transmission selection unit 48 makes a selection in accordance with a predetermined rule. Upon completion of step S7, the process proceeds to step S8.

When the transmission selection unit 48 selects transmission (step S8: transmission), the process proceeds to step S4. In this case, the transmission/reception processing unit 44 performs the transmission process shown in FIG. 4. Otherwise, when the transmission selection unit 48 selects standby (step S8: standby), the transmission prohibition unit 50 prohibits the transmission process in the current transmission/reception period. In addition, the transmission/reception processing unit 44 stands by without performing any transmission process. In other words, the remote wireless device 18 gives another remote wireless device 18 an opportunity to transmit a signal to the base wireless device 16. At this time, if one remote wireless device 18 performs a transmission process, transmission of a signal from the remote wireless device 18 to the base wireless device 16 will be successful.

When the process proceeds from step S5 to step S9, the counting unit 46 adds 1 to the count value N. After completion of step S9, the process in the current transmission/reception period is completed.

[B Transmission Process]

Figure 4:
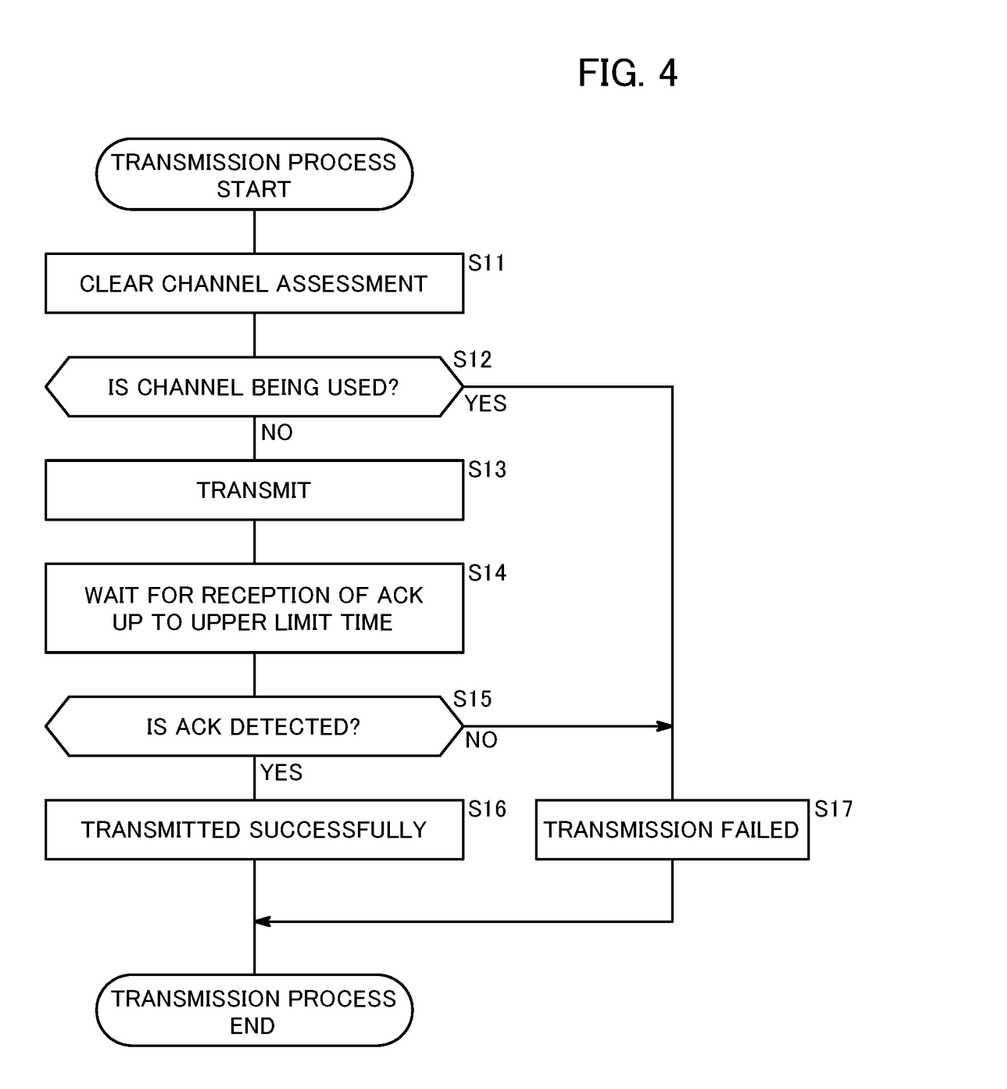
FIG. 4 is a flowchart illustrating a transmission process.

FIG. 4 is a flowchart illustrating a transmission process. In step S4 of the main process illustrated in FIG. 3, a process of step S11 to step S17 described below is performed. The transmission process described below includes a CCA, a transmission of a signal, and a reception and acknowledgement of ACK transmitted from the base wireless device 16.

In step S11, the transmission/reception processing unit 44 performs a CCA. The transmission/reception processing unit 44 detects a radio wave using the same frequency as the frequency of its own channel selected at that time. Upon completion of step S11, the process proceeds to step S12.

In step S12, the transmission/reception processing unit 44 determines whether the frequency of the own channel is being used based on the result of performing the CCA. When the frequency of the own channel is not being used (step S12: NO), the process proceeds to step S13. Otherwise, when the frequency of the own channel is being used (step S12: YES), the process proceeds to step S17.

In step S13, the transmission/reception processing unit 44 uses the remote communication unit 36 to transmit a signal indicating the information to be conveyed to the base wireless device 16. Upon completion of step S13, the process proceeds to step S14.

In step S14, the transmission/reception processing unit 44 waits for an ACK transmitted from the base wireless device 16 up to the upper limit time. When the remote communication unit 36 receives the ACK, the transmission/reception processing unit 44 detects the ACK. At this time, the transmission/reception processing unit 44 confirms that the ACK has been received. The upper limit time is determined based on the transmission/reception period, that is, the period of the frequency hopping. The transmission/reception processing unit 44 takes the remaining time up to the timing of switching to the next frequency as the upper limit time. Upon completion of step S14, the process proceeds to step S15.

In step S15, the transmission/reception processing unit 44 determines whether or not the ACK is detected. When the transmission/reception processing unit 44 detects the ACK (step S15: YES), the process proceeds to step S16. Otherwise, when the transmission/reception processing unit 44 does not detect the ACK (step S15: NO), the process proceeds to step S17.

In step S16, the transmission/reception processing unit 44 determines that the transmission has been made successfully. Upon completion of step S16, the process proceeds to step S5 shown in FIG. 3.

Otherwise, when the process proceeds from step S12 or step S15 to step S17, the transmission/reception processing unit 44 determines that the transmission has failed. Upon completion of step S17, the process proceeds to step S5 shown in FIG. 3.

[1-5 Example of Transmission Mode]

Figure 5:
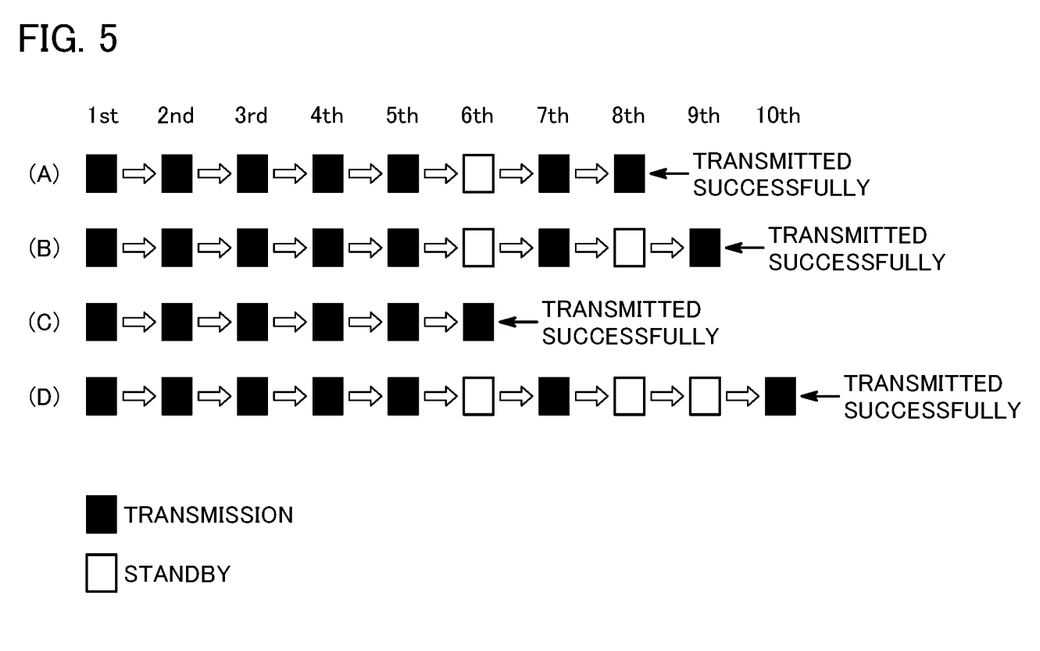
FIG. 5 is a diagram illustrating an example of a transmission form according to the first embodiment.

FIG. 5 is a diagram illustrating an example of a transmission form according to the first embodiment. FIG. 5 shows a situation in which each of four remote wireless devices 18 shown in FIG. 1 simultaneously performs a transmission process to the base wireless device 16, resulting in signal collision. Here, the four remote wireless devices 18 are referred to as remote wireless devices 18(A) to 18(D).

The characters (A) to (D) in FIG. 5 indicate the remote wireless devices 18(A) to 18(D). The characters 1st, 2nd, . . . , 10th in FIG. 5 indicate a first transmission/reception period, a second transmission/reception period, . . . , and a tenth transmission/reception period which come after the generation of the information to be conveyed in each of the remote wireless devices 18. The first transmission/reception period to the tenth transmission/reception period are continuous. A black rectangle indicates that the transmission/reception processing unit 44 performs the transmission process. A white rectangle indicates that the transmission/reception processing unit 44 stands by without performing the transmission process.

The transmission/reception processing units 44 of the remote wireless devices 18(A) to 18(D) performs transmission processes at each transmission/reception period until the count value N is equal to or greater than 5. Until the fifth transmission/reception period ends, signal collision occurs, and signal transmission performed by each of the remote wireless devices 18(A) to 18(D) fails. After the count value N becomes equal to or greater than 5, the transmission/reception processing unit 44 of each of the remote wireless devices 18(A) to 18(D) performs transmission process or stands by without performing transmission process. In the transmission mode shown in FIG. 5, only the remote wireless device 18(C) performs a transmission process in the sixth transmission/reception period. In contrast, the remote wireless device 18(A), the remote wireless device 18(B), and the remote wireless device 18(D) stand by. At this time, no collision of signals occurs. Therefore, the signal transmission performed by the remote wireless device 18(C) is made successfully. Thereafter, similarly, when only one remote wireless device 18 performs the transmission process, the transmission of the remote wireless device 18 is made successfully.

When there is a remote wireless device 18 connected to the S/A 20 that is frequently used, the transmission selection unit 48 of such a remote wireless device 18 may use a predetermined rule for making the transmission more likely to be selected. According to this configuration, the information to be conveyed of S/A 20 that is frequently used is more likely to be conveyed to the base wireless device 16.

As described above, according to the first embodiment, the remote wireless devices 18 mutually give up transmission opportunities, thereby reducing the number of collisions of signals transmitted to the base wireless device 16. Therefore, the signal transmission performed by each remote wireless device 18 is likely to be successful at an early stage. As a result, a decrease in the communication speed due to collision of signals is suppressed, in the communication network 14.

2 Second Embodiment

As in the first embodiment, a communication network 14 of the second embodiment is also provided in an industrial wireless communication system 10. A remote wireless device 18 of the second embodiment has a function of selecting a transmission slot 56 (FIG. 7), in addition to the function of the remote wireless device 18 of the first embodiment.

[2-1 Remote Wireless Device 18]

Figure 6:
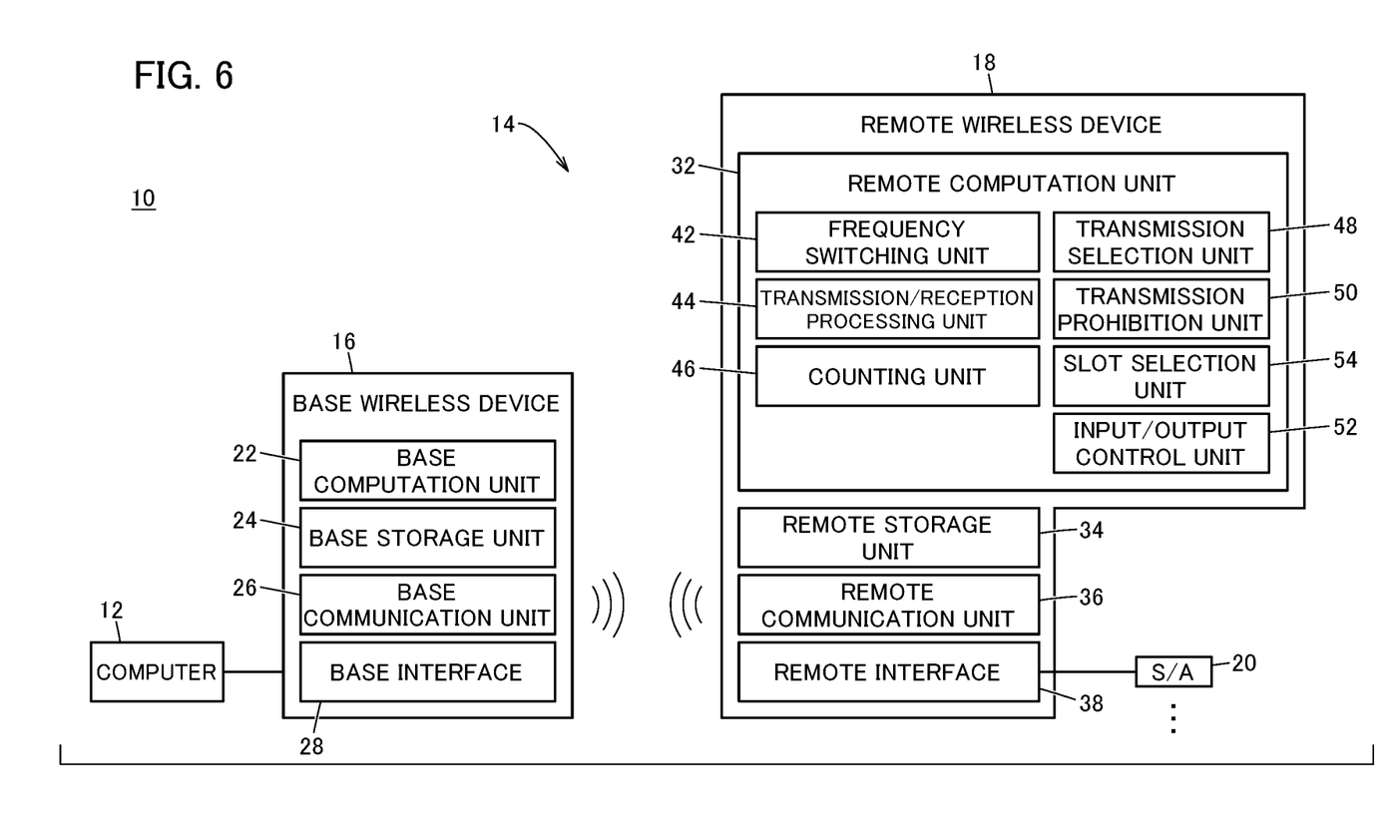
FIG. 6 is a functional block diagram of a wireless communication system according to a second embodiment.

FIG. 6 is a functional block diagram of the wireless communication system 10 according to the second embodiment. The remote wireless device 18 of the second embodiment includes the entire configuration of the remote wireless device 18 of the first embodiment. In the configuration of the remote wireless device 18 according to the second embodiment, configurations that are common to those of the remote wireless device 18 according to the first embodiment are denoted by the same reference numerals as those in the first embodiment. In the second embodiment, a remote computation unit 32 also functions as a slot selection unit 54.

Figure 7:
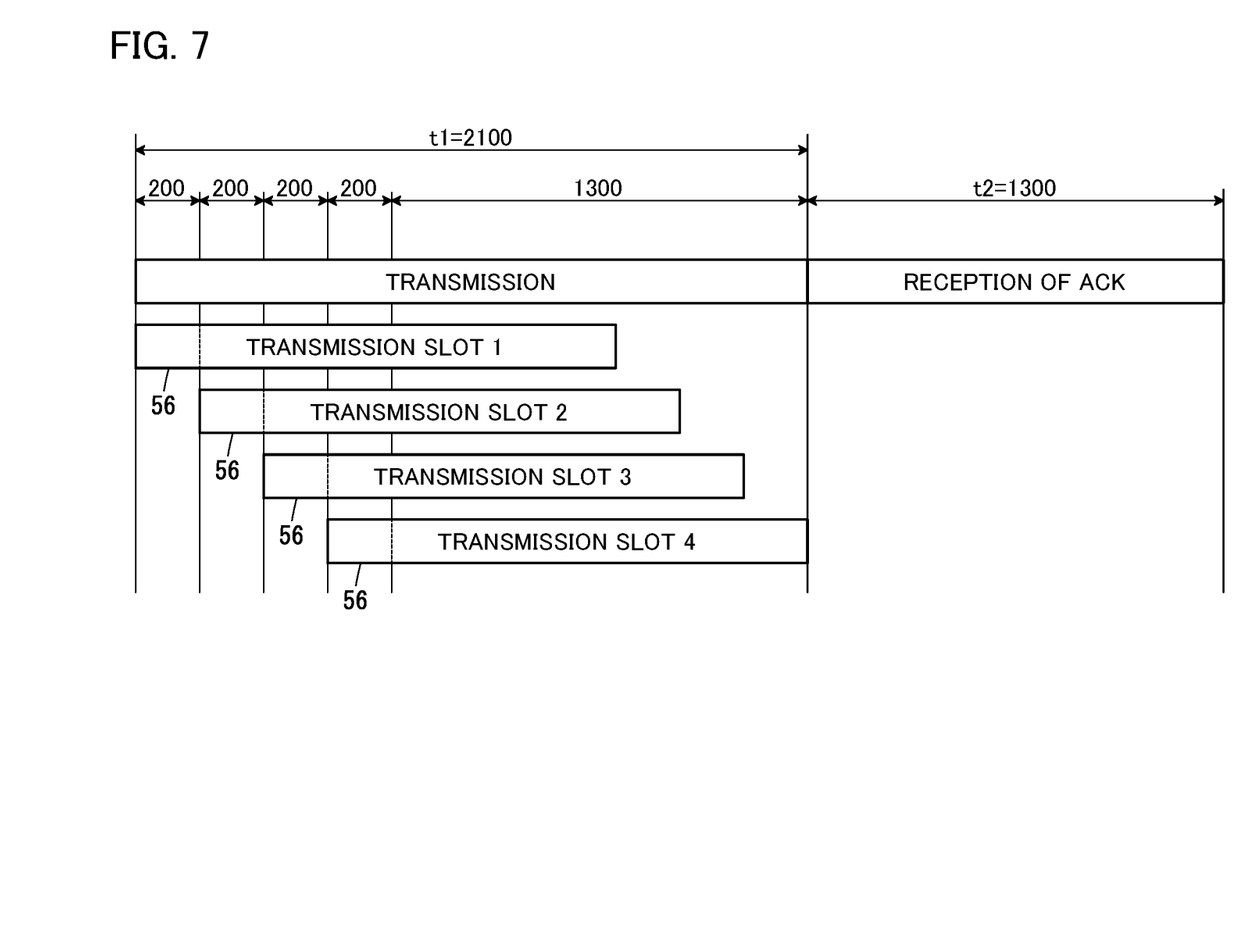
FIG. 7 is a flowchart illustrating a transmission slot in one transmission/reception period.

As illustrated in FIG. 7, one transmission/reception period includes a transmission time t1, a reception time t2, and other unillustrated times (such as a transmission/reception switching time). The transmission time t1 is a time frame used when the transmission/reception processing unit 44 transmits a signal. For example, the transmission time t1 lasts for 2100 [μsec]. The reception time t2 is a time frame used when the transmission/reception processing unit 44 receives an ACK transmitted from the base wireless device 16. For example, the reception time t2 lasts for 1300 [μsec]. The transmission time t1 is set to a time longer than a time during which the transmission/reception processing unit 44 performs a CCA and transmits a signal of one packet.

The slot selection unit 54 provides a plurality of transmission slots 56 having different start timings for each transmission process during the transmission time t1. For example, as illustrated in FIG. 7, the slot selection unit 54 provides a plurality of transmission slots 56 having start timings that are different from each other by the time interval of the CCA. When the transmission time t1 is 2100 [μsec], the time required for the CCA is 200 [μsec], and the time for transmitting a signal of one packet is 1300 [μsec], the slot selection unit 54 can provide four transmission slots 56 during the transmission time t1. The slot selection unit 54 can change the number of transmission slots 56 provided in the transmission time t1, in accordance with the time required for the CCA and the time for transmitting a signal of one packet. The number of transmission slots 56 and the start timing are stored in advance in the remote storage unit 34.

Further, before the transmission process is performed, the slot selection unit 54 selects one transmission slot 56 from the plurality of transmission slots 56 by any method. For example, the slot selection unit 54 may select the transmission slot 56 according to a predetermined rule. The predetermined rule may be information that determines the selection order of the transmission slots 56. Further, the predetermined rule may be an algorithm etc. for making a selection at random, for example, an algorithm for generating a pseudo random number sequence. As another method, the slot selection unit 54 may select the transmission slot 56 in accordance with a first rule when the count value N is less than a predetermined number of determination, and may select the transmission slot 56 in accordance with a second rule when the count value N is equal to or greater than the number of determination. In this case, the first rule may be information that determines the selection order of the transmission slots 56, and the second rule may be an algorithm etc. for making a random selection, for example, an algorithm for generating a pseudo random number sequence. The predetermined rule, the first rule, and the second rule are stored in advance in the remote storage unit 34.

[2-2 Process Performed by Remote Wireless Device 18]

Figure 8:
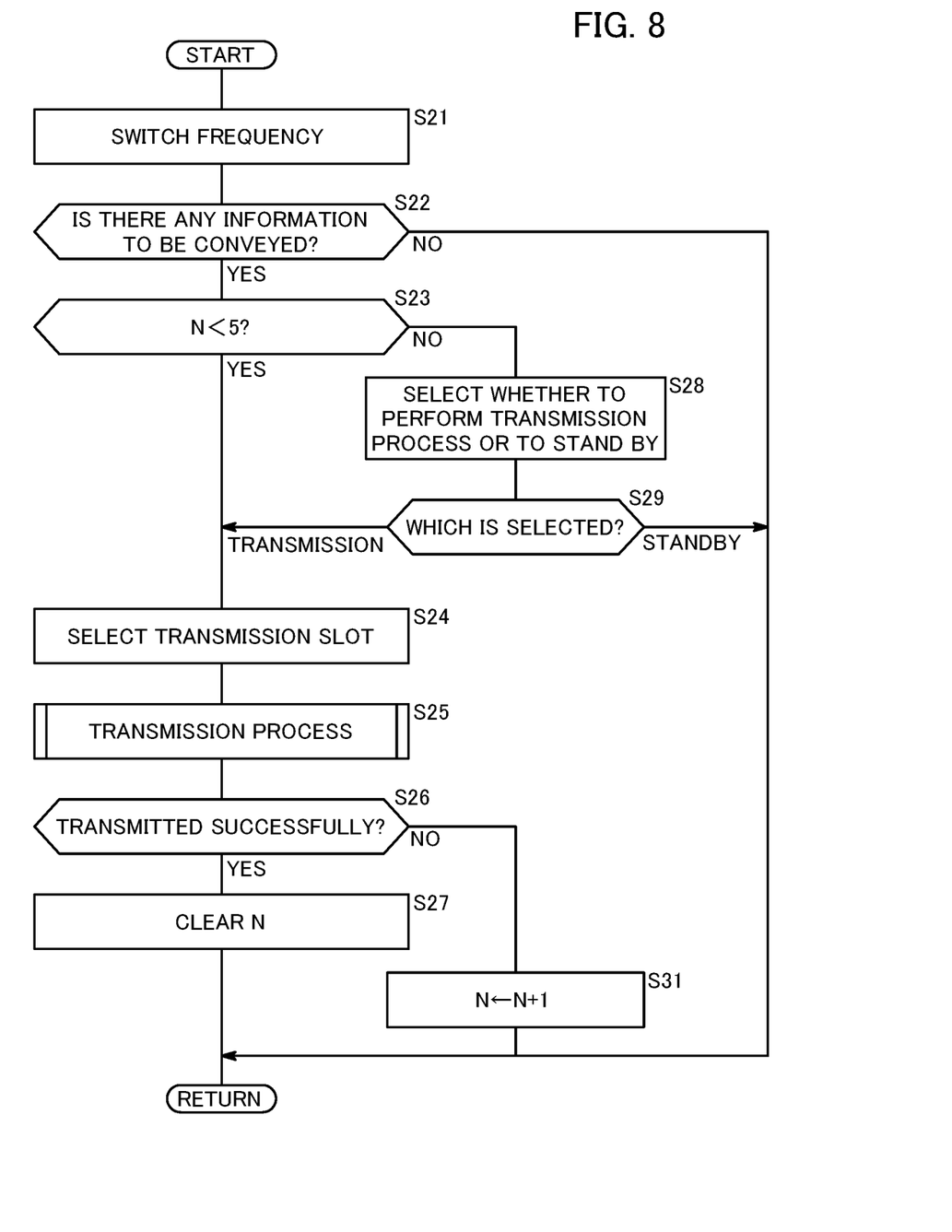
FIG. 8 is a flowchart illustrating a main process according to the second embodiment.

FIG. 8 is a flowchart illustrating a main process according to the second embodiment. The remote computation unit 32 performs the main process shown in FIG. 8 for each transmission/reception period. The main process shown in FIG. 8 is substantially the same as the main process shown in FIG. 3 except that the processing of step S24 is added. In step S24, the slot selection unit 54 selects the transmission slot 56. In step S25, the transmission/reception processing unit 44 uses the selected transmission slot 56 to perform a process of transmitting a signal.

[2-3 Example of Transmission Mode]

Figure 9:
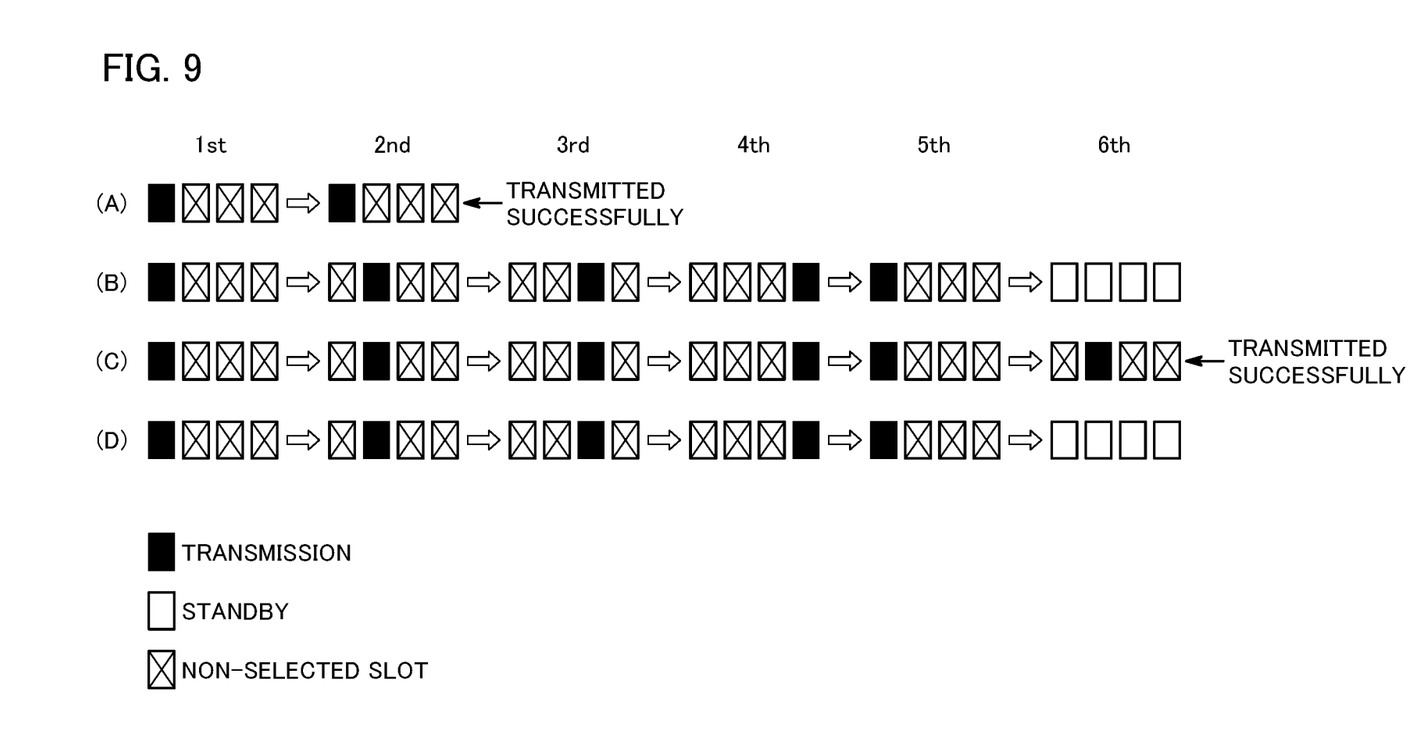
FIG. 9 is a diagram illustrating an example of a transmission form according to the second embodiment.

FIG. 9 is a diagram illustrating an example of a transmission form according to the second embodiment. FIG. 9 shows a situation in which each of four remote wireless devices 18 shown in FIG. 1 simultaneously performs a transmission process to the base wireless device 16, resulting in signal collision. Here, the four remote wireless devices 18 are referred to as remote wireless devices 18(A) to 18(D).

As with FIG. 5, the characters (A) to (D) in FIG. 9 indicate the remote wireless devices 18(A) to 18(D). The characters 1st, 2nd, . . . , 6th in FIG. 9 indicate a first transmission/reception period, a second transmission/reception period, . . . , and a sixth transmission/reception period which come after the generation of the information to be conveyed in each of the remote wireless devices 18. The first transmission/reception period to the sixth transmission/reception period are continuous. The four rectangles in each period represent four transmission slots 56. The transmission timings of the four transmission slots 56 are delayed from left to right. The black rectangles indicate transmission slots 56 selected by the slot selection unit 54 and used by the transmission/reception processing unit 44. The rectangles with X therein indicate transmission slots 56 that are not selected by the slot selection unit 54. In addition, a period in which four white rectangles are lined up indicates that the transmission/reception processing unit 44 stands by without performing the transmission process.

In the first transmission/reception period, the transmission/reception processing units 44 of the remote wireless devices 18(A) to 18(D) use the first transmission slot 56 to perform transmission process. In this case, signal collision occurs, and transmissions of signals performed by the remote wireless devices 18(A) to 18(D) fail.

In the second transmission/reception period, the transmission/reception processing unit 44 of the remote wireless device 18(A) uses the first transmission slot 56 (transmission slot 1) to perform a transmission process. The transmission/reception processing units 44 of the remote wireless devices 18(B) to 18(D) each use a second transmission slot 56 (transmission slot 2) to perform a transmission process. The transmission/reception processing units 44 of the remote wireless devices 18(B) to 18(D) each detect the signal of the remote wireless device 18(A) by the CCA. Therefore, the transmission/reception processing units 44 of the remote wireless devices 18(B) to 18(D) do not transmit signals. At this time, no collision of signals occurs. Therefore, the signal transmission performed by the remote wireless device 18(A) is made successfully.

In addition, as in the first embodiment, after the count value N becomes equal to or greater than 5, the transmission/reception processing units 44 of the remote wireless devices 18(A) to 18(D) each perform the transmission process or stand by without performing the transmission process.

When there is a remote wireless device 18 connected to the S/A 20 that is frequently used, the slot selection unit 54 of such a remote wireless device 18 may be more likely to select the first transmission slot 56. At this time, the slot selection unit 54 may use a rule for making the first transmission slot 56 more likely to be selected. According to this configuration, the information to be conveyed of S/A 20 that is frequently used is more likely to be conveyed to the base wireless device 16.

As described above, according to the second embodiment, since the transmission timings of the remote wireless devices 18 are shifted from each other, the number of collisions of signals transmitted to the base wireless device 16 is reduced. Therefore, the signal transmission performed by each remote wireless device 18 is likely to be made successfully at an early stage. As a result, a decrease in the communication speed due to collision of signals is suppressed, in the communication network 14.

3. Technical Concepts that can be Obtained from the Embodiments

A description will be given below concerning the technical concepts that can be grasped from the above-described embodiments.

According to a first aspect of the present invention, the remote wireless device 18 transmits and receives signals to and from the base wireless device 16 in the transmission/reception period, and includes the transmission/reception processing unit 44 configured to perform a transmission process of a signal in each of a plurality of continuous transmission/reception periods until transmission to the base wireless device 16 is made successfully, the counting unit 46 configured to count number of times of performed transmission processes, the transmission selection unit 48 configured to select whether to perform the transmission process or stand by in a next transmission/reception period in accordance with a predetermined rule in a case that a count value N by the counting unit is equal to or greater than predetermined number, and the transmission prohibition unit 50 configured to prohibit the transmission process by the transmission/reception processing unit 44 in a case that standby is selected by the transmission selection unit 48.

In the first aspect of the present invention, the remote wireless device 18 may further include the slot selection unit 54 configured to select one transmission slot 56 from among the plurality of transmission slots 56 that are provided in each of the transmission/reception periods and each have a different start timing of the transmission process, wherein the transmission/reception processing unit 44 may perform the transmission process using the transmission slot 56 selected by the slot selection unit 54.

In the first aspect of the present invention, the transmission/reception processing unit 44 may perform, as the transmission process, a clear channel evaluation, transmission of a signal, and reception of an acknowledgement transmitted from the base wireless device 16, and determine that the transmission has failed in a case that it is detected that a channel is used, by carrying out the clear channel evaluation, or in a case that the acknowledgement is not received.

In the first aspect of the present invention, the slot selection unit 54 may select the transmission slot 56 in accordance with the first rule in a case that the count value N is less than a predetermined number of determination, and select the transmission slot 56 in accordance with the second rule in a case that the count value N is equal to or greater than the number of determination.

According to a second aspect of the present invention, the communication method of the remote wireless device 18 that transmits and receives a signal to and from a base wireless device 16 in a transmission/reception period is provided. The method includes a transmission/reception processing step of performing a transmission process of a signal in each of a plurality of continuous transmission/reception periods until transmission to the base wireless device 16 is made successfully, a counting step of counting number of times of performed transmission processes, a transmission selection step of selecting whether to perform the transmission process or stand by in a next transmission/reception period in accordance with a predetermined rule in a case that the count value N by the counting step is equal to or greater than a predetermined number, and a transmission prohibition step of prohibiting the transmission process in a case that standby is selected in the transmission selection step.

In the second aspect of the present invention, the method may further include a slot selection step of selecting one transmission slot 56 from among a plurality of transmission slots 56 that are provided in each of the transmission/reception periods and each have a different start timing of the transmission process, wherein in the transmission/reception processing step, the transmission process may be performed using the transmission slot 56 selected in the slot selection step.

In the second aspect of the present invention, in the transmission/reception processing step, as the transmission process, a clear channel evaluation, transmission of a signal, and reception of an acknowledgement transmitted from the base wireless device 16 may be performed, and it may be determined that the transmission has failed in a case that it is detected that a channel is used, by carrying out the clear channel evaluation, or in a case that the acknowledgement is not received.

In the second aspect of the present invention, in the slot selection step, the transmission slot 56 may be selected in accordance with the first rule in a case that the count value N is less than a predetermined number of determination, and the transmission slot 56 may be selected in accordance with the second rule in a case that the count value N is equal to or greater than the number of determination.

The present invention is not particularly limited to the embodiment described above, and various modifications are possible without departing from the essence and gist of the present invention.

What is claimed is:

1. A remote wireless device that transmits and receives signals to and from a base wireless device in a transmission/reception period, comprising one or more processors that execute computer-executable instructions stored in a memory, wherein the one or more processors execute the computer-executable instructions to cause the remote wireless device to:
   perform a transmission process of a signal in each of a plurality of continuous transmission/reception periods until transmission to the base wireless device is made successfully;
   count a number of times of retrials of the transmission processes performed over the plurality of continuous transmission/reception periods;
   compare a count value of the number of times of retrials with a predetermined number;
   select whether to perform the transmission process or stand by in a next transmission/reception period in accordance with a predetermined rule in a case that it is determined that the count value is equal to or greater than the predetermined number;
   prohibit the transmission process in the next transmission/reception period in a case that standby is selected; and
   perform the transmission process in the next transmission/reception period in a case that the transmission process is selected to be performed.

2. The remote wireless device according to claim 1, wherein the one or more processors cause the remote wireless device to:
   select one transmission slot from among a plurality of transmission slots that are provided in each of the transmission/reception periods and that each have a different start timing of the transmission process, and
   perform the transmission process using the transmission slot selected.

3. The remote wireless device according to claim 2, wherein the one or more processors cause the remote wireless device to perform, as the transmission process, a clear channel evaluation, transmission of a signal, and reception of an acknowledgement transmitted from the base wireless device, and to determine that the transmission has failed in a case that it is detected that a channel is used, by carrying out the clear channel evaluation, or in a case that the acknowledgement is not received.

4. The remote wireless device according to claim 2, wherein the one or more processors cause the remote wireless device to select the transmission slot in accordance with a first rule in a case that the count value is less than a predetermined number of determination, and to select the transmission slot in accordance with a second rule in a case that the count value is equal to or greater than the number of determination.

5. A communication method of a remote wireless device that transmits and receives a signal to and from a base wireless device in a transmission/reception period, the method comprising:
   performing a transmission process of a signal in each of a plurality of continuous transmission/reception periods until transmission to the base wireless device is made successfully;

counting a number of times of retrials of the transmission processes performed over the plurality of continuous transmission/reception periods;

comparing a count value of the number of times of retrials with a predetermined number;

selecting whether to perform the transmission process or stand by in a next transmission/reception period in accordance with a predetermined rule in a case that it is determined that the count value is equal to or greater than the predetermined number;

prohibiting the transmission process in the next transmission/reception period in a case that the transmission process is selected to be standby; and performing the transmission process in the next transmission/reception period in a case that the transmission process is selected to be performed.

6. The communication method of the remote wireless device according to claim 5, further comprising selecting one transmission slot from among a plurality of transmission slots that are provided in each of the transmission/reception periods and each have a different start timing of the transmission process, wherein in performing the transmission process, the transmission process is performed using the transmission slot selected in selecting the one transmission slot.

7. The communication method of the remote wireless device according to claim 6, wherein in performing the transmission process, a clear channel evaluation, transmission of a signal, and reception of an acknowledgement transmitted from the base wireless device are performed, and it is determined that the transmission has failed in a case that it is detected that a channel is used, by carrying out the clear channel evaluation, or in a case that the acknowledgement is not received.

8. The communication method of the remote wireless device according to claim 6, wherein in selecting the one transmission slot, the transmission slot is selected in accordance with a first rule in a case that the count value is less than a predetermined number of determination, and the transmission slot is selected in accordance with a second rule in a case that the count value is equal to or greater than the number of determination.

* * * * *